United States Patent
Cannon et al.

(10) Patent No.: US 6,973,331 B1
(45) Date of Patent: Dec. 6, 2005

(54) CORDED TELEPHONE DIALER EMULATION

(75) Inventors: Joseph M. Cannon, Harleysville, PA (US); James A. Johanson, Macungie, PA (US); Philip D. Mooney, North Wales, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/412,182

(22) Filed: Oct. 5, 1999

(51) Int. Cl.[7] .............................................. H04M 1/00
(52) U.S. Cl. .................................. 455/564; 455/404.1
(58) Field of Search .................... 455/404.1, 550.1, 455/564, 462; 379/355.01, 355.03, 37, 216.01, 379/355.09, 56.1

(56) References Cited

U.S. PATENT DOCUMENTS

| | | | |
|---|---|---|---|
| 5,161,180 A | * | 11/1992 | Chavous ....................... 379/45 |
| 5,260,988 A | * | 11/1993 | Schellinger et al. ..... 455/552.1 |
| 5,535,260 A | * | 7/1996 | Zicker et al. ................ 455/419 |
| 5,555,286 A | * | 9/1996 | Tendler .................. 379/355.03 |
| 5,896,565 A | * | 4/1999 | Miller .......................... 340/539 |
| 6,070,065 A | * | 5/2000 | Armbruster et al. ........ 455/404 |
| 6,240,285 B1 | * | 5/2001 | Blum et al. .................. 455/404 |

* cited by examiner

*Primary Examiner*—Vivian Chin
*Assistant Examiner*—Lewis West

(57) ABSTRACT

A cordless telephone according to one embodiment of the invention includes a base unit and a handset, wherein the handset includes a keypad, a key scan element adapted to scan the keypad for a predetermined key sequence, and a controller adapted to cause the initiation of an outgoing call based on a determination of the predetermined key sequence. In one embodiment, the predetermined key sequence is 9-1-1. In an alternative embodiment according to the invention, a method of placing a telephone call from a cordless telephone handset that is in an on-hook condition includes the steps of sensing the activation of a predetermined key sequence, and initiating a telephone call based on the sensed activation. The telephone call may be to a telephone number corresponding to the predetermined key sequence, such as 9-1-1.

18 Claims, 2 Drawing Sheets

CORDED TELEPHONE DIALER EMULATION

FIELD OF THE INVENTION

This application is related to the field of telephony, and more particularly to cordless telephones.

BACKGROUND OF THE INVENTION

Cordless telephones are telephones that include a base unit which is coupled to a telephone network via a telephone line, and a handset that communicates with the base unit via an RF link. When not in use, the handset is typically cradled in a receiving portion of the base unit for battery charging purposes, or simply left on a table or other piece of furniture. Compared to a conventional "corded" telephone, a cordless telephone provides a user with a significant degree of physical flexibility, as the user is free to roam within a fairly large area and maintain communication during a telephone call.

The operational functionality of a cordless telephone differs slightly with that of a conventional corded telephone. One way that they differ is that a conventional corded telephone presents a dial tone to a user in response to a handset thereof being lifted from a corresponding base. This action causes a switchhook to transition from an on-hook position, wherein the telephone does not have a closed loop with a service provider, such as a central office of a public switched telephone network, to an off-hook position, wherein there is such a closed loop.

As a result, upon lifting a handset of a conventional corded telephone and activating keys of a corresponding keypad, dialing information, typically in the form of dual tone multifrequency (DTMF) digits, is presented to the service provider. In contrast, when a user picks up a handset from a typical cordless telephone, the user is not presented a dial tone. Instead, the user is required to first press a button, such as a "TALK" button or a "PHONE" button, in order to be presented with a dial tone.

Some cordless telephones are configured to make a transition between off-hook and on-hook states based on cradling or decradling of the handset from the base, such that a connection with the central office will be terminated upon detection of a cradling event, and a connection with the central office will be initiated upon detection of a decradling event. However, if the user wishes to terminate a telephone call when not near the base, the user must press a button, such as an "OFF" button, at which point the on-hook transition occurs and the user can safely place the handset on a table, couch, etc. If the user subsequently wishes to initiate an outgoing call with a handset placed in such a manner, the user must first activate a particular button on the keypad in order to receive a dial tone.

The operational difference between the functionality of a conventional corded telephone and a typical cordless telephone may be problematic. For example, children are typically taught at a young age that in the case of an emergency they should pick up the nearest telephone and dial 9-1-1. This message is drilled into them from Sesame Street™ and other PBS™ programming, from daycare, from preschool, etc. However, the tutorial simply states to dial 9-1-1. It does not instruct a child, necessarily, to first listen for a dial tone, and to first press the proper buttons on the keypad to obtain a dial tone if one is not present. A dangerous situation may therefore exist where a child is attempting to contact emergency personnel, but is unable to because the cordless handset is in an on-hook condition and is waiting for the proper activation direction. There is therefore a need for a cordless telephone handset that is responsive to a 9-1-1 sequence even if the handset is in an on-hook condition.

SUMMARY OF THE INVENTION

This need is met by a cordless telephone that includes a base unit and a handset, wherein the handset includes a keypad, a key scan element adapted to scan the keypad for a predetermined key sequence, and a controller adapted to cause the initiation of an outgoing call based on a determination of the predetermined key sequence. In one embodiment, the predetermined key sequence is 9-1-1.

In an alternative embodiment according to the invention, a method of placing a telephone call from a cordless telephone handset that is in an on-hook condition includes the steps of sensing the activation of a predetermined key sequence, and initiating a telephone call based on the sensed activation. The telephone call may be to a telephone number corresponding to the predetermined key sequence, such as 9-1-1.

BRIEF DESCRIPTION OF THE DRAWINGS

Objects and advantages of the invention will be apparent to one of skill in the art upon review of the following detailed description in light of the drawing, wherein.

DETAILED DESCRIPTION

Figure 1:
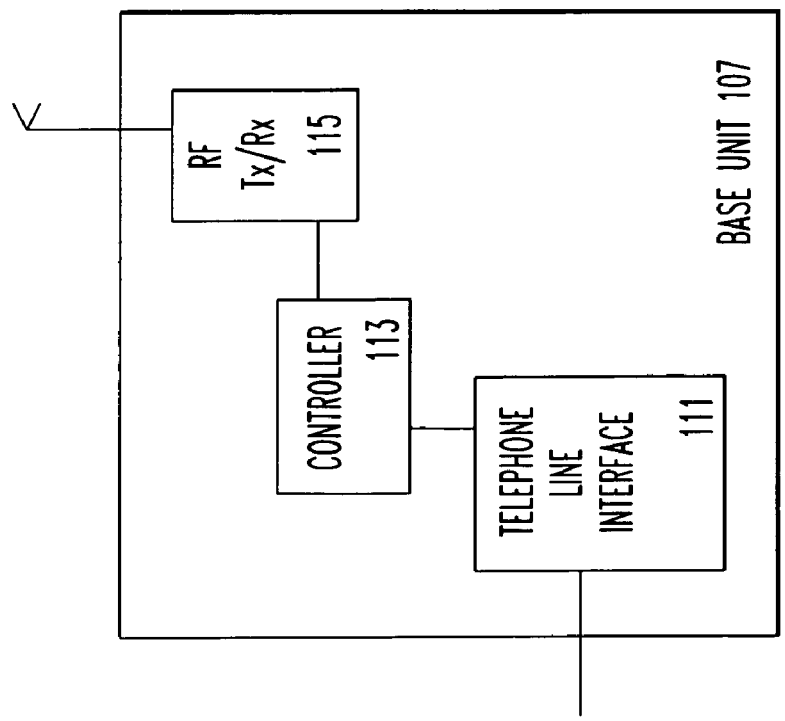
FIG. 1 is a simplified block diagram of an exemplary telephone adapted to operate according to the invention.
Figure 1:
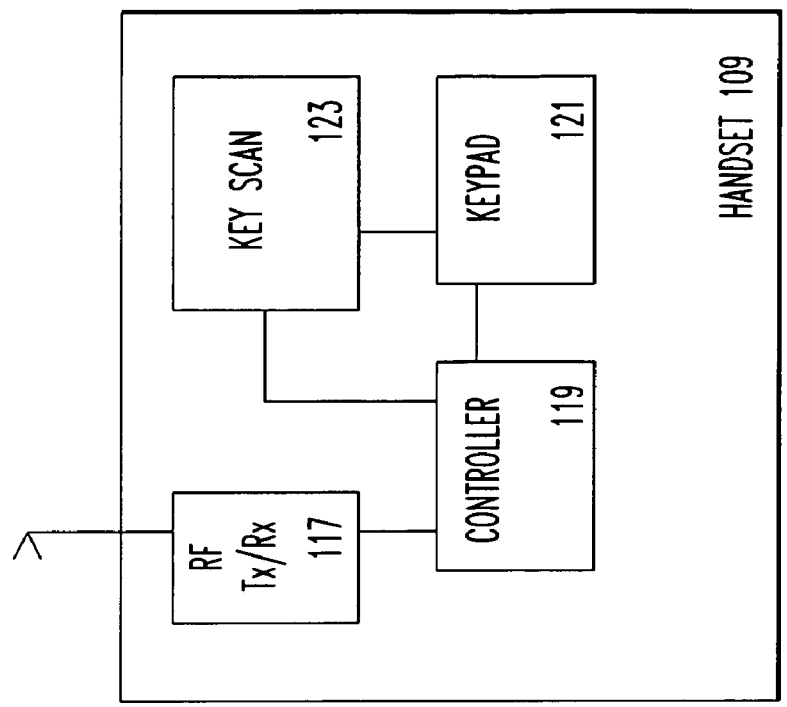

FIG. 1 is a simplified block diagram of a cordless telephone 105 as a first embodiment according to the invention. Cordless telephone 105 includes a base unit 107 and a handset 109. The base unit 107 includes a telephone line interface 111, which couples the base unit to a telephone network, such as a public switched telephone network. The base unit 107 also includes a controller 113, and an RF transceiver 115. The handset 109 includes an RF transceiver 117, a controller 119, a keypad 121, and a key scan element 123. The base unit 107 and handset 109, of course, also include other conventional elements, such as a microphone, a speaker, etc., but these conventional elements are omitted here to facilitate an understanding of the invention by focusing primarily on those elements associated therewith.

At the block diagram level, cordless telephone 105 appears to be the same as a conventional cordless telephone. For example, a conventional cordless telephone handset has a key scan element, typically as a programmed module within a controller or digital signal processor, that continuously scans a keypad and identifies activated keys to a controller for processing. Cordless telephone 105 is unique, by comparison, based on the functionality programmed into the controller 119 and/or the key scan element 123, which are likely modules within a particular integrated circuit microcontroller or digital signal processor.

In particular, the key scan element 123 continuously scans the keypad to determine if any keys are activated, even when telephone 105 is in an off-hook condition, and either passes the activation information to the controller 119, or analyzes the information and informs the controller if a particular sequence has been activated. The continuous scanning of the keypad is not unique to the invention, as a conventional key scan element typically scans a keypad continuously to determine, for example, if the "TALK" or "PHONE" button has been activated. Alternatively, a conventional key scan element may passively scan for an electrical signal that will cause a processor interrupt. Also, one of skill in the art understands that the continuous scanning is actually periodic, occurring at a very high frequency.

According to the invention, however, when a particular sequence of keys are activated, a determination will be made by either the key scan element 123 or the controller 119, and the detection of the particular sequence will lead to the initiation of an outgoing telephone call. In a particular example, the particular sequence is the 9-1-1 sequence, and the outgoing telephone call is placed to 9-1-1.

In contrast with a conventional cordless telephone handset, therefore, the handset 109 causes the proper initiation of an emergency telephone call even if the telephone 105 is in an off-hook condition. A conventional handset (or base, if a keypad is located therein), on the other hand, would not react to the activation of the 9-1-1 keys if the user had not first obtained a dial tone, such as by pressing the "PHONE" button.

Figure 2:
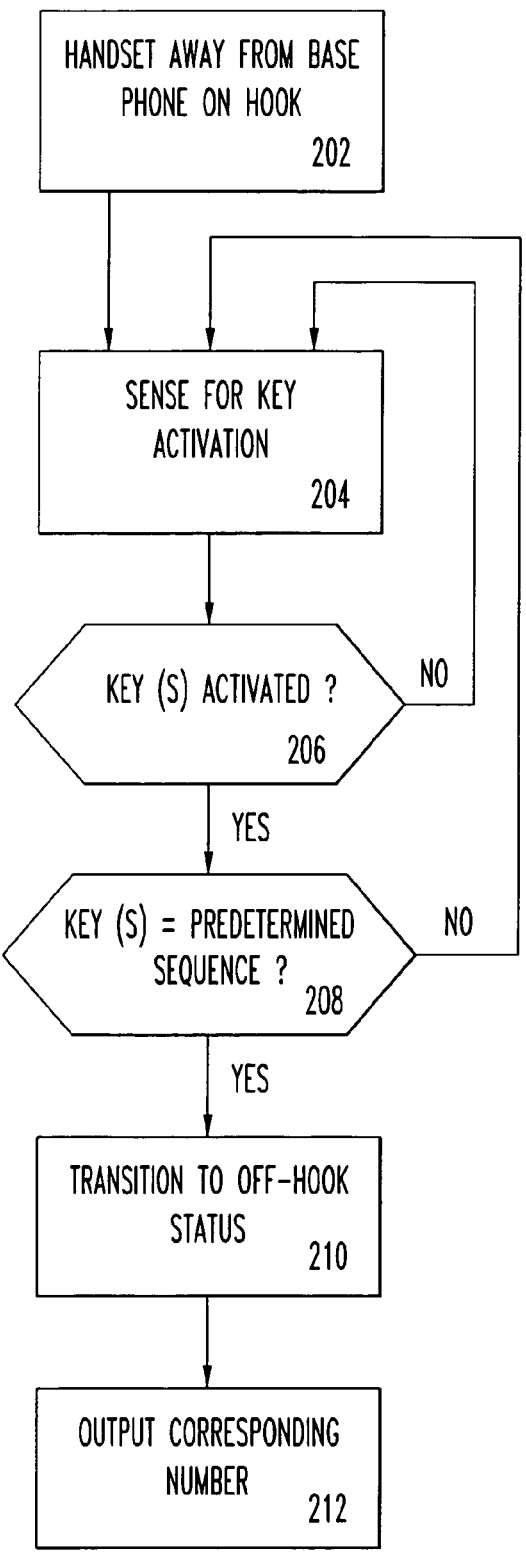
FIG. 2 is a simplified operational flowchart of a telephone adapted to operate according to the invention.

FIG. 2 is an exemplary simplified operational flowchart according to the invention. At step 202, the handset 109 is separate from the base unit 107, and the telephone 105 is in an on-hook condition. At step 204, key scan element 123 scans the keypad. At step 206, a determination is made as to whether any of the keys of the keypad 121 have been activated.

If the answer at step 206 is "NO", then the key scan element continues to scan the keypad for activation at step 204. If, on the other hand, one or more keys of keypad 121 have been activated, at step 208 the activated key(s) are compared to one or more predetermined key sequences to determine if there is a match between the activated keys and a key sequence. If there is not a match, then the activated keys are essentially ignored, and the telephone 105 remains in the on-hook condition, returning to step 204 for continued key scan operations. If, on the other hand, there is a match, then at step 210 telephone 105 transitions to an off-hook state, and at step 212 a telephone number is output.

The transition to the off-hook state is directed, for example, by controller 113 in response to a signal received from controller 119 via an RF link between transceivers 115 and 117. Further, controller 119 may direct the output of the number at step 212, such as by causing the output of dual tone multifrequency information associated with a particular telephone number. Alternatively, the controller 113 may be directed by the controller 119 such that controller 113 creates the communication channel via the telephone line interface 111, and then merely passes along dual tone multifrequency data output by controller 119 via the RF link.

In one embodiment according to the invention, telephone 105 is preprogrammed prior to purchase to include the feature of the present invention, such that the programming in particular causes the scanning for the 9-1-1 sequence, and the telephone 105 automatically initiates a call to the 9-1-1 telephone number upon such detection. Such programming may occur at a point of manufacture of the integrated circuit controller, and thus be included in ROM code, or may be programmed into the controller by a manufacturer as part of the assembly of the controller and other parts into a telephone.

In an alternative embodiment according to the invention, the query at step 208 is slightly modified to include not only the predetermined key sequence (e.g. 9-1-1), but to also include a predetermined period (preferably short) of keypad inactivity following the last item in the sequence. The advantage of this embodiment is that it would prevent the dialing of 9-1-1 if the keys are actually being activated in a random sequence, such as by a child playing with the handset 109, and the child inadvertently presses the 9-1-1 sequence.

In an alternative embodiment, the predetermined key sequence and/or the corresponding telephone number are user programmable, such that a user can program the telephone to respond to any particular key sequence by placing a telephone call to any particular telephone number. This programming may be accomplished as part of a normal set up routine, whereby the user enters the programming information via the keypad 121 and receives feedback via a display integrated into handset 109 or base unit 107. Thus, for example, the result of the programming may be that any time the keys corresponding to "Grandma's telephone number" are activated, then a call will be initiated to Grandma, even if the off-hook transition had not occurred earlier.

This alternative is also advantageous in areas where 9-1-1 service is not in place, in which case the user can program in an alternative emergency telephone number, or may alternatively program in a user's work telephone number to be called whenever the user's children dial 9-1-1. Additionally, this option may be useful as an alternative or supplement to programming a limited number of particular speed dial buttons.

Based on an understanding of these various embodiments, one of skill in the art is likely to conceive of alternative embodiments that are not specifically enumerated here, but that are clearly within the scope of the invention

What is claimed is:

1. A cordless telephone, comprising:
 a base unit of said cordless telephone; and
 a telephone line interface adapted to interface said base unit directly to a public switched telephone network;
 wherein a handset of said cordless telephone is adapted to directly communicate with said base unit, said handset including
 a keypad,
 a key scan element adapted to scan said keypad for a predetermined key sequence while said handset is in an on-hook condition, without receiving an available dial tone, and
 a controller adapted to cause said initiation of an outgoing call based on a determination of said predetermined key sequence without a need to manually instruct said cordless telephone to go off-hook.

2. A cordless telephone as recited in claim 1, wherein:
 said outgoing call is initiated to a telephone number corresponding to said predetermined key sequence.

3. A cordless telephone as recited in claim 1, wherein said predetermined key sequence comprises:
 9-1-1.

4. A cordless telephone as recited in claim 1, wherein:
 said base unit is adapted to establish a link with a network based on a signal from said controller in said handset, to sense a dial tone, and to output dual tone multifrequency signals corresponding to a number to be dialed to said network.

5. A cordless telephone as recited in claim 4, wherein the network comprises:
 a public switched telephone network.

6. A handset of a cordless telephone, comprising:
 a keypad adaptively attached to said handset of said cordless telephone, a key scan element adapted to scan said keypad for a predetermined key sequence while said handset is in an on-hook condition, without receiving an available dial tone, and a controller adapted to cause initiation of an outgoing call by outputting a signal to a corresponding base unit, directly interfaced with said handset, with a telephone line interface in direct communication with a public switched telephone network based on a determination of said predetermined key sequence without a need to manually instruct said cordless telephone to go off-hook.

7. A handset of a cordless telephone as recited in claim 6, further comprising:

an RF transceiver;

wherein said signal is output to said base unit via said RF transceiver.

8. A handset of a cordless telephone as recited in claim 6, wherein:

said signal informs said base unit that said predetermined key sequence has been detected.

9. A handset of a cordless telephone as recited in claim 6, wherein the signal comprises:

a dialing sequence of a number to be dialed.

10. A handset of a cordless telephone as recited in claim 9, wherein:

said dialing sequence corresponds to said predetermined key sequence.

11. A method of placing a telephone call from a cordless telephone comprising a cordless telephone handset and a base unit with a telephone line interface that is in an on-hook condition, comprising steps of:

sensing activation of a predetermined key sequence while said cordless telephone handset is in the on-hook condition, without receiving an available dial tone; and initiating a telephone call based on said sensed activation without a need to manually instruct the cordless telephone to go off-hook;

wherein said cordless telephone handset is adaptively interfaced directly with said base unit and said base unit is adaptively interfaced directly with a public switched telephone network.

12. A method of placing a telephone call from a cordless telephone comprising a cordless telephone handset and a base unit with a telephone line interface that is in an on-hook condition as recited in claim 11, wherein:

said telephone call is to a telephone number corresponding to said predetermined key sequence.

13. A method of placing a telephone call from a cordless telephone comprising a cordless telephone handset and a base unit with a telephone line interface that is in an on-hook condition as recited in claim 12, wherein the predetermined key sequence comprises:

9-1-1.

14. A method of placing a telephone call from a cordless telephone comprising a cordless telephone handset and a base unit with a telephone line interface that is in an on-hook condition as recited in claim 11, wherein the initiating step comprises:

sending a signal to a corresponding base unit.

15. A method of placing a telephone call from a cordless telephone comprising a cordless telephone handset and a base unit with a telephone line interface that is in an on-hook condition as recited in claim 14, wherein:

said signal indicates detection of said predetermined key sequence.

16. A method of placing a telephone call from a cordless telephone comprising a cordless telephone handset and a base unit with a telephone line interface that is in an on-hook condition as recited in claim 14, wherein the signal comprises:

a dialing sequence.

17. A method of placing a telephone call from a cordless telephone comprising a cordless telephone handset and a base unit with a telephone line interface that is in an on-hook condition as recited in claim 16, wherein:

said dialing sequence corresponds to said predetermined key sequence.

18. A method of placing a telephone call from a cordless telephone comprising a cordless telephone handset and a base unit with a telephone line interface that is in an on-hook condition as recited in claim 14, wherein:

said signal is sent via an RF link.

* * * * *